United States Patent [19]
Nishii et al.

[11] Patent Number: 6,089,676
[45] Date of Patent: Jul. 18, 2000

[54] HYDRAULIC BRAKE APPARATUS FOR A VEHICLE

[75] Inventors: Michiharu Nishii; Masaki Oishi, both of Toyota, Japan

[73] Assignee: Aisin Seiki Kabushiki Kaisha, Kariya, Japan

[21] Appl. No.: 09/107,464

[22] Filed: Jun. 30, 1998

[30] Foreign Application Priority Data

Oct. 20, 1997 [JP] Japan .................................. 9-287253

[51] Int. Cl.⁷ .................................................. B60T 13/18
[52] U.S. Cl. ...................... 303/11; 303/113.4; 303/114.1; 60/592
[58] Field of Search .......................... 303/113.4, 114.1, 303/10, 11, 116.1; 188/358, 359; 60/592, 591, 584, 560, 562

[56] References Cited

U.S. PATENT DOCUMENTS

| | | | |
|---|---|---|---|
| 3,928,970 | 12/1975 | Farr .......................................... | 60/562 |
| 5,171,072 | 12/1992 | Maehara ............................... | 303/114.1 |
| 5,261,730 | 11/1993 | Steiner et al. ....................... | 303/113.4 |
| 5,515,678 | 5/1996 | Kurokawa et al. ..................... | 60/591 |
| 5,851,057 | 12/1998 | Terazawa et al. ................... | 303/113.4 |
| 5,878,573 | 3/1999 | Kobayashi et al. ...................... | 60/591 |
| 5,924,530 | 7/1999 | Nishii et al. ............................ | 188/358 |
| 5,927,074 | 7/1999 | Nishii et al. ............................... | 303/11 |

FOREIGN PATENT DOCUMENTS

9-24818  1/1997  Japan .
9-24819  1/1997  Japan .
2 170 874  8/1986  United Kingdom .

*Primary Examiner*—Robert J. Oberleitner
*Assistant Examiner*—Mariano Sy
*Attorney, Agent, or Firm*—Burns, Doane, Swecker & Mathis, LLP

[57] ABSTRACT

The present invention is directed to a hydraulic brake apparatus for applying braking force to each wheel of a vehicle in response to depression of a brake pedal. An auxiliary pressure source is provided for pressurizing the brake fluid in the reservoir to discharge power pressure. A control piston is slidably disposed in a cylinder body ahead of a master piston to be movable in response to movement thereof, so that a regulator chamber is defined ahead of the control piston, and a rear end thereof is exposed to a pressure chamber. A pressure increase valve is provided for communicating the regulator chamber with the auxiliary pressure source or cutting off the communication in response to movement of the control piston. A pressure decrease valve is provided for communicating the regulator chamber with the reservoir or cutting off the communication in response to movement of the control piston. A resilient member is disposed in the cylinder body for defining a counter-force chamber into which pressure is fed from one of the pressure chamber, auxiliary pressure source and power chamber. The resilient member is adapted to activate the pressure increase and decrease valves to move in a direction opposite to a direction thereof moved by the control piston. A pressure control valve is controlled in response to driving and/or braking conditions of the vehicle to vary the pressure in the counter-force chamber continuously thereby to be regulated into a predetermined pressure.

20 Claims, 4 Drawing Sheets

HYDRAULIC BRAKE APPARATUS FOR A VEHICLE

This application claims priority under 35 U.S.C. Sec. 119 to No. 9-287253 filed in Japan on Oct. 20, 1997, the entire content of which is herein incorporated by reference.

BACKGROUND OF THE INVENTION

1. Field of the Invention

The present invention relates to a hydraulic brake apparatus for supplying a hydraulic brake pressure to each wheel brake cylinder mounted on each wheel of a vehicle, and more particularly to a apparatus which is provided with a hydraulic pressure boosting device.

2. Description of the Related Arts

As for hydraulic brake apparatuses, various types are known and already on the market, including the apparatus of a type provided with a hydraulic pressure boosting device. For instance, the U.S. Pat. No. 3,928,970 discloses a power-assisted master cylinder using a source of fluid under pressure, which includes a piston movable in a cylinder bore, a pressure space ahead of the piston having an outlet for connection to a brake circuit, a power chamber behind the piston having an inlet for connection to the source of the fluid under pressure, and a control valve assembly for controlling the supply of fluid from the pressure source to the power chamber. It was the object of that patent to provide the assembly in which a piston is pedal operated but which does not require a movable inlet or inlet seals which move under pressure. And, there is disclosed a master cylinder assembly which includes a first piston and a second piston, between which a first pressure space is defined and connected to a hydraulic pressure circuit. Ahead of the second piston, a second pressure space is defined and connected to a space behind the first piston. An inlet valve member is provided for introducing the pressure discharged from the pressure source into the second pressure space, and an exhaust valve is provided for communicating the second pressure space with a reservoir, and these valve members are adapted to be actuated in response to movement of the second piston.

Also, in order to increase a braking force when a rapid braking operation is made in case of emergency for example, Japanese Patent Laid-open Publication No. 9-24818 proposes a vehicle braking control apparatus, which includes a regulator for regulating power pressure discharged from a power source and supplying regulated pressure to wheel brake cylinders during a normal braking operation, and changeover device for communicating the pressure source directly with the wheel brake cylinders in case of an emergency braking operation. That publication discloses the regulator using a spool valve, and discloses device for varying an area for receiving the regulated pressure, so as to provide a desired characteristic of the regulated pressure to the master cylinder pressure. In practice, a resilient member such as rubber is placed ahead of the spool valve through an engaging member, to restrict the pressure applied to the spool valve, in accordance with increase of the area of the resilient member contacting with the engaging member. Also, Japanese Patent Laid-open Publication No. 9-24819 discloses an apparatus for increasing the braking force in case of the emergency braking operation.

According to the apparatuses of the above-described Japanese Patent Laid-open Publication Nos. 9-24818 and 9-24819, it is possible to increase the braking force in case of the emergency braking operation. However, the apparatuses provide only two kinds of characteristics of the master cylinder pressure to braking input force for the normal braking operation and the emergency braking operation. In other words, it is impossible to maintain a certain characteristic of a vehicle deceleration to the braking input force by varying the characteristic of the master cylinder pressure in response to variations of load to the vehicle and coefficient of friction of a brake pad, for example, to improve a braking property. In the U.S. Pat. No. 3,928,970 as described above, the apparatus having the inlet valve and exhaust valve is not adapted to increase the braking force in case of the emergency braking operation, different from those apparatuses as shown in Publication Nos. 9-24818 and 9-24819, so that it is difficult to improve the braking property of the apparatus.

SUMMARY OF THE INVENTION

Accordingly, it is an object of the present invention to provide a hydraulic brake apparatus for a vehicle which can vary a characteristic of master cylinder pressure to braking input force in various manners.

In order to accomplish the above and other objects, a hydraulic brake apparatus is provided for applying braking force to each wheel of a vehicle in response to depression of a manually operated braking member. The apparatus includes a cylinder body mounted on the vehicle, a reservoir for storing brake fluid, a master cylinder having a master piston slidably received in the cylinder body to define a pressure chamber ahead of the master piston and a power chamber behind the master piston, so that the brake fluid in the reservoir is fed into the pressure chamber, and the master piston is moved in response to operation of the manually operated braking member to discharge hydraulic brake pressure from the pressure chamber. An auxiliary pressure source is provided for pressurizing the brake fluid in the reservoir to discharge power pressure of a predetermined value. A control piston is slidably disposed in the cylinder body ahead of the master piston to be movable in response to movement of the master piston, so that the control piston defines ahead thereof a regulator chamber, and exposes a rear end thereof to the pressure chamber. The power chamber is communicated with the regulator chamber to assist forward movement of the master piston. A pressure increase valve device is provided for communicating the regulator chamber with the auxiliary pressure source or cutting off the communication therebetween in response to movement of the control piston. Also, a pressure decrease valve device is provided for communicating the regulator chamber with the reservoir or cutting off the communication therebetween in response to movement of the control piston. A counter-force control device is provided for producing counter-force in response to the pressure generated in one of the pressure chamber, the auxiliary pressure source and the power chamber, and applying the counter-force to the pressure increase valve device and the pressure decrease valve device to be moved in a direction opposite to a direction thereof moved by the control piston. The counter-force control device is adapted to continuously vary the counter-force to be regulated into a predetermined force.

Preferably, the counter-force control device is adapted to produce the counter-force substantially in proportion to the pressure generated in one of the pressure chamber, the auxiliary pressure source and the power chamber, with a rate determined on the basis of driving and/or braking conditions of the vehicle.

The counter-force control device may comprise a resilient member which is disposed in the cylinder body for defining a counter-force pressure chamber into which pressure is fed from one of the pressure chamber, the auxiliary pressure source and the power chamber. The resilient member is adapted to activate the pressure increase valve device and the pressure decrease valve device to move in a direction opposite to a direction thereof moved by the control piston. The counter-force control device may further comprise a pressure control valve device for continuously varying the pressure in the counter-force pressure chamber to be regulated into a predetermined pressure, and an electronic control unit for controlling the pressure control valve device in response to the driving and/or braking conditions of the vehicle.

The apparatus may further comprise a load sensor for detecting load applied to the vehicle, and a brake-pad friction sensor for detecting a coefficient of friction of a brake pad operatively mounted on the wheel of the vehicle. The electronic control unit is adapted to control the pressure control valve device to regulate the pressure in the counter-force pressure chamber to be equal to the pressure which is generated in one of the pressure chamber, the auxiliary pressure source and the power chamber, when the load and the coefficient of friction of the brake pad are within a predetermined range, respectively, while the electronic control unit is adapted to control the pressure control valve device to regulate the pressure in the counter-force pressure chamber to be zero, when the load detected by the load sensor is of the maximum value, and the coefficient of friction of the brake pad detected by the brake-pad friction sensor is of the minimum value.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
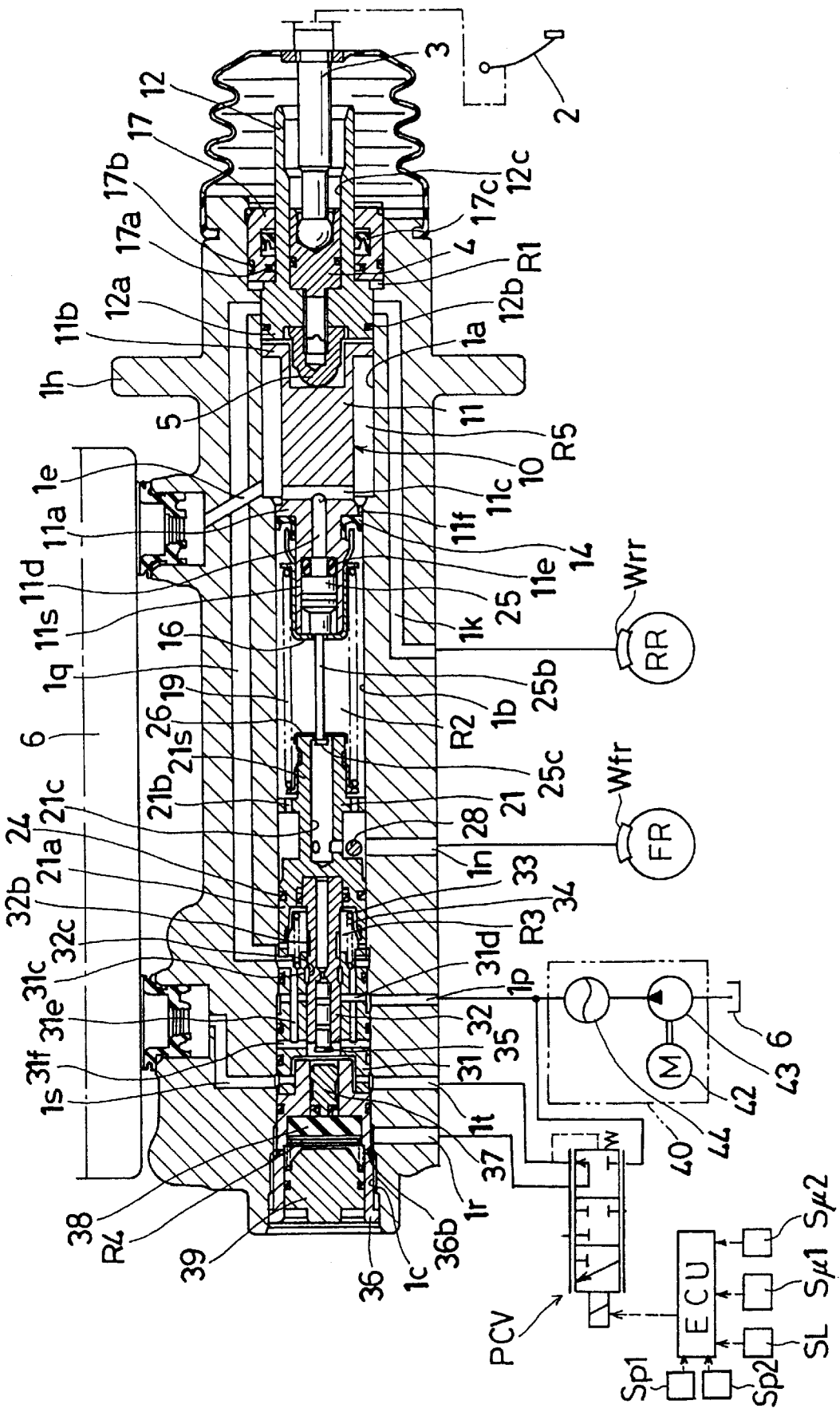
FIG. 1 is a sectional view of a hydraulic brake apparatus according to an embodiment of the present invention.

Referring to FIG. 1, there is illustrated a hydraulic brake apparatus for a vehicle according to an embodiment of the present invention, which includes a cylinder body 1h provided with a master cylinder section and a regulator section. The regulator section is formed in the cylinder body 1h at the front of the vehicle (left in FIG. 1), and the master cylinder section is formed in the cylinder body 1h at the rear of the vehicle, and a brake pedal 2 is disposed behind it to serve as a manually operated braking member according to the present invention. When depressing force is applied to the brake pedal 2, the force is transmitted as braking input force to the master cylinder section through a push rod 3 and an input member 4. In response to the braking input force, the hydraulic brake pressure generated from the master cylinder section is supplied to wheel brake cylinders Wfr, Wfl which are operatively mounted on front right and left wheels FR, FL, and the hydraulic brake pressure generated from the regulator section is supplied to wheel brake cylinders Wrr, Wrl which are operatively mounted on rear right and left wheels RR, RL, respectively (FIG. 1 shows only wheel brake cylinders Wfr, Wrr which are operatively mounted on a front right wheel FR and a rear right wheel RR, respectively).

In the cylinder body 1h, there is formed a stepped bore which includes bores 1a, 1b, 1c having different inner diameters from one another, and in which a master piston 10 and a control piston 21 are received to define a pressure chamber R2 between the master piston 10 and control piston 21. The rear end of the bore 1a is communicated with a boosting chamber or power chamber R1 having an inner diameter larger than that of the bore 1a. The control piston 21 is fluid-tightly and slidably fitted into the bore 1b having the smallest diameter. The master piston 10 includes two pistons 11, 12, end portions of which are received in the bore 1b and the bore 1a having a larger diameter than the bore 1b, respectively. That is, a land portion 11a of a small diameter is formed around an outer surface of a front portion of the piston 11, and a land portion 11b of a large diameter is formed at a rear portion of the piston 11 with a certain distance axially apart from the land portion 11a. The land portion 11a retains an annular cup-like seal member 14 to be fluid-tightly and slidably received in the bore 1b, while the land portion 11b is slidably received in the bore 1a to abut on the piston 12.

The piston 11 has a cylindrical support portion 11s extending from the end of the land portion 11a and a recess 11e formed axially in the support portion 11s. Furthermore, the piston 11 has a radial passage 11c, and an axial passage 11d communicated therewith and opened to communicate with the recess 11e in which a valve member 25 is slidably received. A retainer 16 is mounted on the support portion 11s to prevent the valve member 25 from moving toward the control piston 21. One end of the valve member 25 is covered by a member made of resilient material such as rubber, which can abut on the passage lid to shut off the same. At the other end of the valve member 25, a rod 25b is formed to be integral with the valve member 25, and an engaging portion 25c is formed at the front end of the rod 25b. At the land portion 11a of the piston 11, an axial passage 11f is formed. The annular seal member 14 is disposed at an open end of the passage 11f communicated with the pressure chamber R2, to provide a one-way valve. Accordingly, a fluid chamber R5, which is communicated with a reservoir 6 through a passage 1e, can be communicated with the pressure chamber R2 through the passages 11c, lid and 11f.

Behind the piston 11 is disposed the piston 12 having a land portion 12a formed around its outer surface at its front portion and provided with an annular seal member 12b to be fluid-tightly and slidably received in the bore 1a. Thus, the power chamber R1 and the fluid chamber R5 are separated by the seal member 12b. At the rear end of the piston 12 is formed a recess 12c in which the input member 4 is received, and the front end of the piston 12 is screwed with a contact member 5. The piston 12 is arranged such that its front end faces the rear end of the piston 11, and that the depressing force of the brake pedal 2 can be transmitted to the piston 11 through the input member 4 and the contact member 5. A main body of the piston 12 is supported by a cylindrical sleeve 17, the inner surface and outer surface of which are formed with annular grooves, and also an annular groove on the inner surface which is axially remote from them by a certain distance. Annular seal members 17a, 17b and 17c are received in those grooves to ensure a sealing property against the power chamber R1. The piston 11 and piston 12 may be formed in a body.

In the front portion of the cylinder body 1h, the regulator section with a spool valve mechanism is formed, and connected to an auxiliary pressure source 40 for discharging the power pressure. The regulator section is adapted to regulate the power pressure to produce a regulated pressure. The auxiliary pressure source 40 includes a hydraulic pressure pump 43 which is driven by an electric motor 42, and its inlet is connected to the reservoir 6 and its outlet is connected to the accumulator 44, through which the power pressure is supplied to a passage 31d via a passage 1p. The control piston 21 has a pair of land portions 21a, 21b which are formed around its outer surface with a certain distance apart axially between them, and received in the bore 1c. An annular seal member 24 is disposed only in the front land portion 21a, and the front space and rear space of the rear land portion 21b are communicated with each other. Thus, the pressure chamber R2 and a regulator chamber R3 which will be described later are separated by the seal member 24, and the pressure chamber R2 is defined between the seal member 24 and the seal member 14 mounted on the land portion 11a of the piston 11.

As shown in FIG. 1, the control piston 21 has a passage 21c which is formed radial and extends axially to be opened at the rear end. An engaging pin 28 is fixed to the cylinder body 1h at the rear end of the land portion 21a, so that the control piston 21 is allowed to move forward, but restrained from moving backward, i.e., the control piston 21 is prevented from moving beyond the pin 28 toward the master piston 10. The control piston 21 has a cylindrical support portion 21s integral therewith to enclose the passage 21c. An engaging portion 25c is formed on the valve member 25, and disposed in the support portion 21s. A retainer 26 is mounted on the support portion 21s, and engaged with the engaging portion 25c to restrain the valve member 25 from moving toward the master piston 10. At the front end of the control piston 21 is formed a recess in which a rear end portion of a spool 32 is held as will be described later.

A cylindrical sleeve 31 and an adjusting member 36 are received in the stepped bore 1c which is communicated with the bore 1b. A regulator chamber R3 is defined between the sleeve 31 and the control piston 21. The sleeve 31 and sleeve-like adjusting member 36 have a plurality of annular grooves formed around its outer periphery, and annular seal members are received in the grooves, respectively. Between the neighboring seal members are formed radial passages 31d, 31f, and a radial passage 36b is formed in the adjusting member 36. The spool 32 is slidably received in the hollow portion of the sleeve 31, and arranged to shut off the opening portion of the passage 31f in accordance with forward movement of the spool 32. The sleeve 31 has a passage 31e, one end of which is communicated with the passage 31f, and the other end of which is communicated with the regulator chamber R3. When the passage 31f is opened, the regulator chamber R3 is communicated with a passage 1s through the passages 31e, 31f. The passage 31d is communicated with the auxiliary pressure source 40 through the passage 1p, while it is closed by the outer peripheral surface of the spool 32 when the spool 32 is placed at a position as shown in FIG. 1. Furthermore, an annular groove 31c is formed on the inner peripheral surface of the sleeve 31 at the rear of the passage 31d. The passage 36b is communicated with a passage 1r.

A plunger 35 is fitted into the front end of the spool 32 to extend axially therefrom. The rear end of the spool 32 is placed in the regulator chamber R3 and engaged with the control piston 21. A retainer 33 is supported in the recess of the control piston 21, and a spring 34 is mounted between the sleeve 31 and the retainer 33 to urge the spool 32 to abut on the control piston 21. When the control piston 21 is placed in its initial position, i.e., rearmost position, the opening portion of the passage 31f is not closed by the spool 32, but the regulator chamber R3 is communicated with the reservoir 6 through the passages 31e, 31f of the sleeve 31 and the passage 1s to be filled with the brake fluid under atmospheric pressure. An annular groove 32b is formed on a predetermined area of the outer surface of the spool 32 along the axis of the spool 32, such that the rear end of the sleeve 31 is positioned in the center of the area when the spool 32 is placed at the rearmost position thereof. And, an annular groove 32c is formed on a predetermined area of the outer surface of the spool 32 with a predetermined distance away from the groove 32b to face the groove 31c of the sleeve 31.

Accordingly, the pressure in the regulator chamber R3 is communicated with the reservoir 6 through the passages 31e, 31f and the passage 1s to be under atmospheric pressure. When the spool 32 is moved forward in response to movement of the control piston 21, the passage 31f of the sleeve 31 is shut off, and in turn the passage 31d of the sleeve 31 faces the groove 32c of the spool 32 and at the same time the groove 31c faces the groove 32b, so that the regulator chamber R3 is communicated with the auxiliary pressure source 40, from which the power pressure is supplied into the regulator chamber R3 to increase the pressure therein. The regulator chamber R3 is communicated with power chamber R1 through a passage 1q formed in the cylinder body 1h.

The adjusting member 36 has a hollow portion defined therein to provide a stepped bore, whose small diameter portion is adapted to receive a transmitting member 37 to be movable along the axis of the member 36, with its rear end surface facing the front end surface of the plunger 35. A resilient member 38 made by rubber for example, is disposed in a large diameter portion of the stepped bore in the member 36 to abut on the front end surface of the transmitting member 37. According to the present embodiment, the transmitting member 37 is provided with a member in the shape of a truncated cone. Instead, the front end portion of the transmitting member 37 may be shaped into the truncated cone. A plug 39 is fitted into the front end of the hollow portion of the adjusting member 36 to define a counter-force pressure chamber R4 between the plug 39 and the resilient member 38. The counter-force chamber R4 is communicated with a pressure control valve PCV through the passage 36b and passage 1r. The pressure chamber R2 is communicated with the wheel cylinder Wfr through a passage 1n, while the power chamber R1 is communicated with the wheel cylinder Wrr through a passage 1k. The pressure control valve PCV is connected to the accumulator 44 of the auxiliary pressure source 40 to input the power pressure therefrom, and connected to the reservoir 6 through the passages 1t and 1s to drain the pressure therefrom, so that the pressure is discharged in proportion to electric current fed from an electronic control unit ECU. That is, the pressure control valve PCV is controlled by the electronic control unit ECU, and normally placed in a position for blocking the communication between a pressure output port and a pressure input port, and connecting the pressure output port to a drain port, as shown in FIG. 1.

Figure 2:
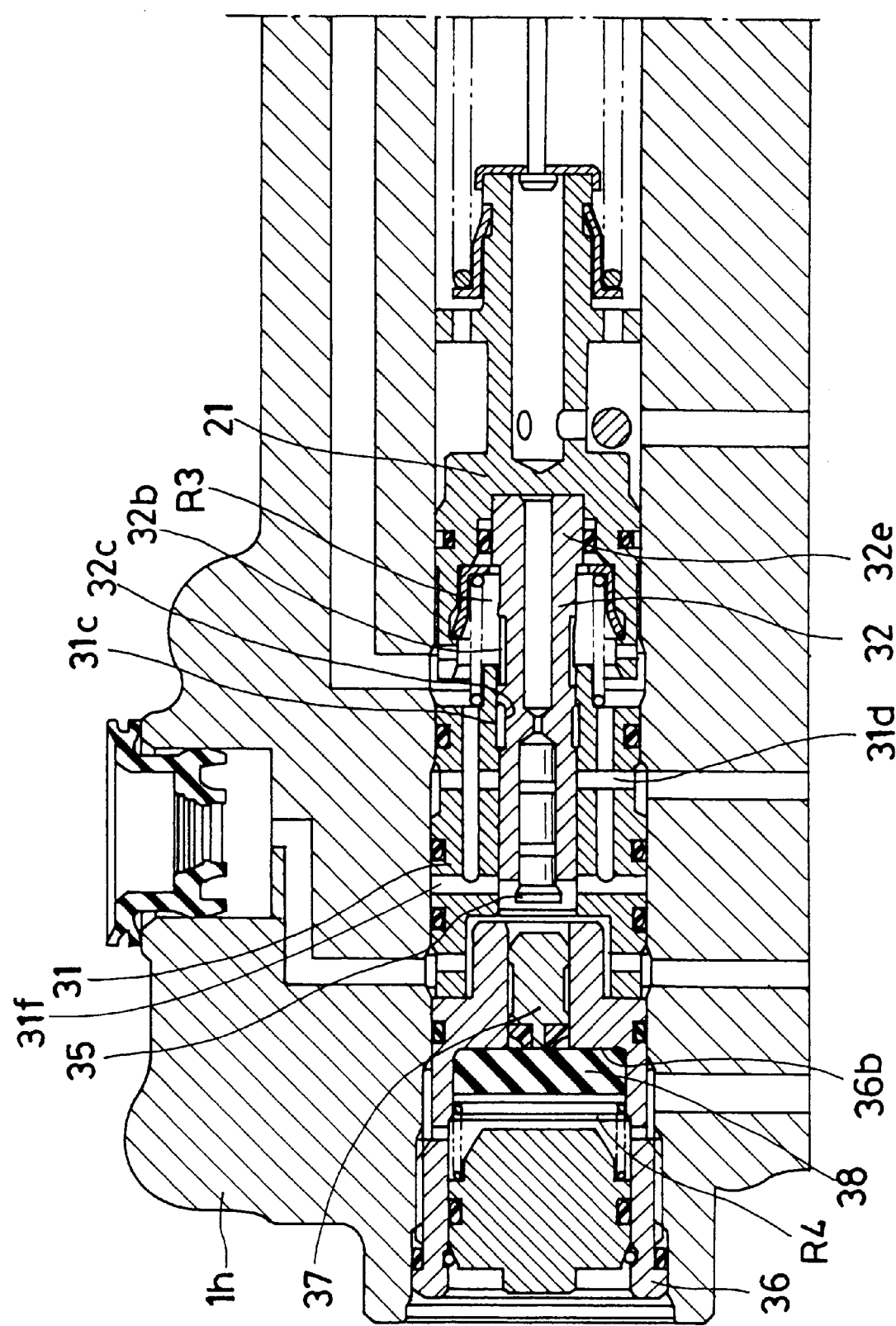
FIG. 2 is an enlarged sectional view of a regulator in the hydraulic brake apparatus of the above embodiment.

FIG. 2 enlarges the regulator section having the spool valve mechanism as described above. The spool 32 is shaped into a stepped cylindrical member having a small diameter main portion and a large diameter portion 32e which is urged to abut on the control piston 21 by device of the spring 34 through the retainer 33. When the pressure in the regulator chamber R3 is increased, the large diameter portion 32e is pressed to the control piston 21. The sleeve 31 is a stepped cylindrical member having a large diameter portion at its front end and a small diameter portion at its rear end, with a passage 31d formed therebetween. When the power pressure is supplied from the auxiliary pressure source 40 through the passage 31d to a space between the large diameter portion and small diameter portion of the sleeve 31, and between the outer surface of the sleeve 31 and the inner surface of the cylinder bore, the sleeve 31 is forced to make the end face of its large diameter portion to abut on the adjusting member 36. As described above, the adjusting member 36 is the cylindrical member with the transmitting member 37 slidably received in its hollow portion. The resilient member 38 is held to abut on the front end surface of the transmitting member 37, and the rear end of the transmitting member 37 is arranged to face the plunger 35 mounted on the front end of the spool 32.

When the hydraulic pressure is supplied into the counter-force chamber R4 by the pressure control valve PCV and applied to the resilient member 38, the spool 32 is moved rearward to decrease the regulated pressure in the regulator chamber R3.

FIGS. 1 and 2 show a state of the apparatus when the brake pedal 2 is not depressed. If the brake pedal 2 is depressed to push the pistons 11, 12 forward (leftward in FIG. 1) through the push rod 3, transmitting member 4 and contact member 5, the valve member 25 abuts on the piston 11 to close the passage 11d by the resilient member of the valve member 25, so that the communication between the pressure chamber R2 and the fluid chamber R5 is cut off to provide a closed state. In the case where the communication between the pressure chamber R2 and the fluid chamber R5 is cut off, if the pistons 11, 12 are moved in response to depression of the brake pedal 2, these will move together in a body, because the piston 11 is held as shown in FIG. 1 by the spring 19. As a result, the passage 31f is closed by the spool 32, which is supported in the control piston 21, to cut off the communication with the reservoir 6. At the same time, the power pressure is supplied from the auxiliary pressure source 40 to the regulator chamber R3 through the passages 1p, 31d, grooves 31c, 32c and 32b, and then to the power chamber R1 through the passage 1q. By the pressure in the power chamber R1, the pistons 11, 12 is assisted to move forward, thereby to compress further the pressure chamber R2, and supply the hydraulic brake pressure, i.e., master cylinder pressure to the wheel brake cylinder Wfr through the passage 1n, and the regulated pressure is supplied from the power chamber R1 to the wheel brake cylinder Wrr through the passage 1k.

Supposing that the pressure equal to the regulated pressure is supplied to the counter-force chamber R4, until the force caused by the pressure in the counter-force chamber R4 is transmitted to the plunger 35 through the resilient member 38 and transmitting member 37, if the force applied to the control piston 21 by the regulated pressure in the regulator chamber R3 exceeds the force applied to the control piston 21 by the master cylinder pressure in the pressure chamber R2, the control piston 21 will be moved rearward to open the passage 31f and communicate with the reservoir 6, so that the pressure in the regulator chamber R3 will be reduced. When the relationship between the forces applied to the control piston 21 is reversed, the control piston 21 is moved forward to close the passage 31f and communicate the regulator chamber R3 with the auxiliary pressure source 40 through the passage 31d and etc., so that the pressure in the regulator chamber R3 is increased. With the above-described movement of the spool 32 repeated in response to movement of the control piston 21, the force applied to control piston 21 by the regulated pressure is regulated to be equal to the force applied to the control piston 21 by the master cylinder pressure. Until the force caused by the pressure in the counter-force chamber R4 is transmitted to the plunger 35 through the resilient member 38 and transmitting member 37, therefore, the regulated pressure is output substantially in proportion to the master cylinder pressure to provide an initial hydraulic brake pressure characteristic.

If the regulated pressure is increased further to increase the pressure supplied into the counter-force chamber R4, and a middle portion of the resilient member 38 is deformed to be displaced rearward, then the transmitting member 37 abuts on the plunger 35 to push the spool 32 rearward, the opening area of the passage 31f will be increased. Accordingly, the regulated pressure in the regulator chamber R3 is reduced to provide a hydraulic brake pressure characteristic which is substantially in proportion to the master cylinder pressure, but which has a smaller increasing rate than that of the initial brake pressure characteristic, i.e., gentle increasing gradient of the master cylinder pressure to the braking input force.

Figure 3:
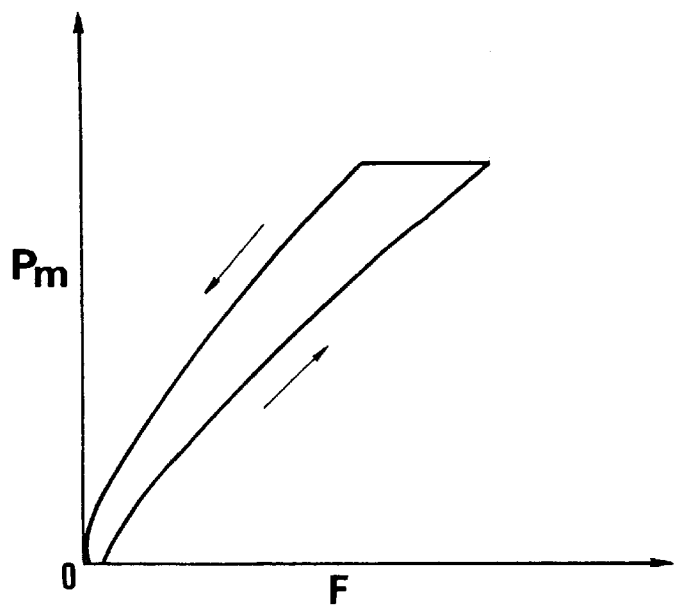
FIG. 3 is a diagram showing a characteristic of master cylinder pressure "Pm" to braking input force "F" of the above embodiment.

FIG. 3 shows a hydraulic brake pressure characteristic of the master cylinder pressure varied in response to the braking input force, when the pressure equal to the regulated pressure is supplied to the counter-force chamber R4. In the characteristic of the master cylinder pressure "Pm" to the braking input force "F" as shown in FIG. 3, a gradient of ΔPm/ΔF is obtained on the basis of a balance between the force applied to the pistons 11, 12 and the force applied to the control piston 21, as follows:

$$\Delta Pm/\Delta F=1/\{C-\beta\cdot(B-A-Re1)\}, \text{ and}$$

$$\beta=C/(C-D+\alpha\cdot E+Re2),$$

where "A" corresponds to an area of a rear end portion of the piston 12, i.e., a portion supported by the sleeve 17, "B" corresponds to an area of a land portion 12a of the piston 12, "C" corresponds to an area of a land portion 21a of the control piston 21, "D" corresponds to an area of a front end portion of the spool 32, "E" corresponds to an area of a portion of the resilient member 38 in contact with the transmitting member 37, "Pp" corresponds to the regulated pressure, "Pr" corresponds to the pressure in the counter-force chamber R4, "α" corresponds to a coefficient of pressure to comply with a relationship of (Pr=α·Pp), "Re1" corresponds to a sliding resistance of the pistons 11, 12, and "Re2" corresponds to the sliding resistance of the control piston 21.

Figure 4:
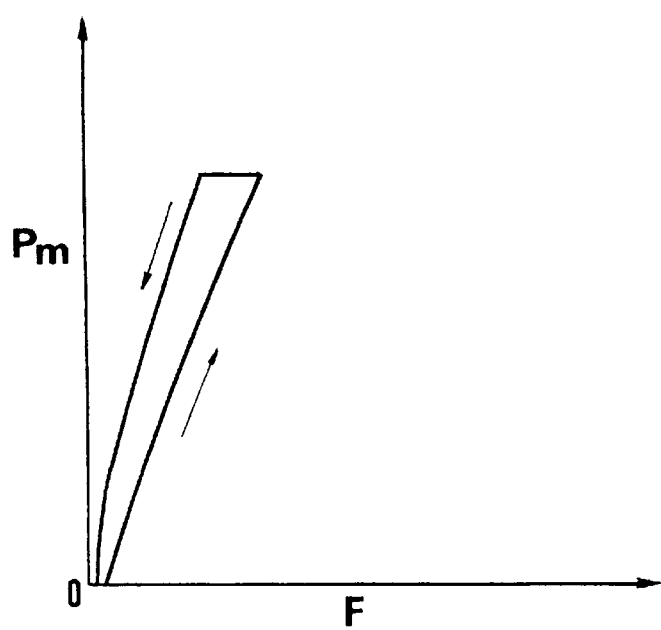
FIG. 4 is a diagram showing a characteristic of master cylinder pressure "Pm" to braking input force "F" of the above embodiment.
Figure 5:
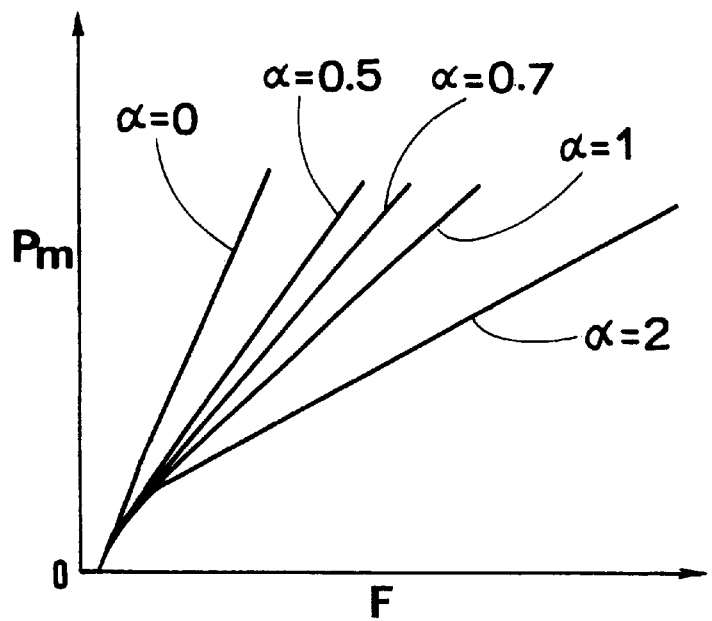
FIG. 5 is a diagram showing a characteristic of master cylinder pressure "Pm" to braking input force "F" of the above embodiment.

Accordingly, the characteristic of the master cylinder pressure "Pm" to the braking input force "F" indicates the steep gradient as shown in FIG. 4, irrespective of variation of the regulated pressure "Pp", if the pressure "Pr" is not supplied to the counter-force chamber R4, i.e., if the coefficient α in the formula of (Pr=α·Pp) is zero. The gradient of the characteristic of the master cylinder pressure "Pm" to the braking input force "F" can be varied as shown in FIG. 5, by selecting 0.5, 0.7 or 2.0 for the coefficient α in the formula of (Pr=Δ·Pp). In FIG. 5, is omitted a hysteresis which is caused by a difference between the characteristics obtained when the braking input force is increased and decreased, as indicated in FIGS. 3, 4.

As shown in FIG. 1, the control unit ECU for controlling the pressure control valve PCV to regulate the pressure in the counter-force chamber R4 is adapted to receive various signals, such as a signal detected by a pressure sensor Sp1 for detecting the regulated pressure in the regulator chamber R3, a signal detected by a pressure sensor Sp2 for detecting the pressure in the counter-force chamber R4, a signal detected by a load sensor SL, a signal detected by a road friction sensor Sµ1 for detecting a coefficient of friction of a road, e.g., a known friction sensor for use in a conventional anti-lock control system, and a signal detected by a brake-pad friction sensor Sµ2, e.g., a sensor for estimating a coefficient of friction of a brake pad for use in a wheel braking mechanism on the basis of an output signal of a brake torque sensor (not shown) mounted on a support member for receiving brake torque applied to the brake pad, and hydraulic brake pressure supplied thereto.

The electronic control unit ECU is adapted to select one of the coefficients a provided as described above, on the basis of the output signals of the sensors SL, Sµ1, Sµ2, and determine a target current value for the pressure control valve PCV to control the pressure Pr to be of a value obtained by multiplying the coefficient α (selected for the pressure Pr) and the regulated pressure Pp together. For example, if the load, the coefficient of friction of the road and the coefficient of friction of the brake pad are standard values, respectively, the control unit ECU selects the coefficient α=1 and determines the target current value on the basis thereof so as to control the pressure in the counter-force chamber R4 to be equal to the regulated pressure. When the load is maximum and the coefficient of friction of the brake pad is minimum, the control unit ECU selects the coefficient α=0 to set the maximum gradient in the hydraulic pressure characteristics as shown in FIGS. 3, 5, thereby to provide a relatively high master cylinder pressure with a relatively small braking input force. Consequently, reduction of the braking force, which might be caused by increase of the load and/or reduction of the coefficient of friction of the brake pad, can be compensated. On the contrary, when the load is very small, the control unit ECU selects the coefficient α=2 to set the minimum gradient of the master cylinder pressure "Pm" to the braking input force "F" as shown in FIG. 5, thereby to provide a small variation of the master cylinder pressure in response to the braking input force. Consequently, fine adjustment of the braking force applied to the wheel can be made easily by fine adjustment of the braking input force. If the coefficient of friction of the road is changed from a very small value to the normal value during the braking operation of the vehicle, the control unit ECU changes the coefficient α from 2 to 1, so that the master cylinder pressure "Pm" is increased thereby to increase the braking force applied to the wheel.

According to the above-described embodiment, if the pressure Pr is set to satisfy the formula Pr=α·Pp±Po, the characteristic of the master cylinder pressure "Pm" to the braking input force "F" will indicate that the master cylinder pressure "Pm" could be shifted upward or downward by the offset pressure "Po", comparing with the values as shown in FIG. 5. With respect to factors used for selecting the coefficient α, not only the factors indicative of the driving conditions of the vehicle such as the load to the vehicle, the coefficient of friction of the road, the coefficient of friction of the brake pad, or the like, but also the factors indicative of amount of braking operation, or the like. For example, if it is determined on the basis of a signal output from a pedal position sensor for detecting a position of the brake pedal that the stroke and speed of the brake pedal have exceeded predetermined values, respectively, it can be determined that the emergency braking operation was made. In this case, therefore, the coefficient α may be set to a small value thereby to increase the master cylinder pressure provided in response to the braking input force. Or, if it is determined on the basis of the signal output from a pedal input sensor for detecting the depressing force applied to the brake pedal and a vehicle deceleration sensor for detecting deceleration of the vehicle that the pedal input and vehicle deceleration are out of a predetermined relationship, the coefficient α may be changed so as to return the relationship to the predetermined one.

Figure 6:
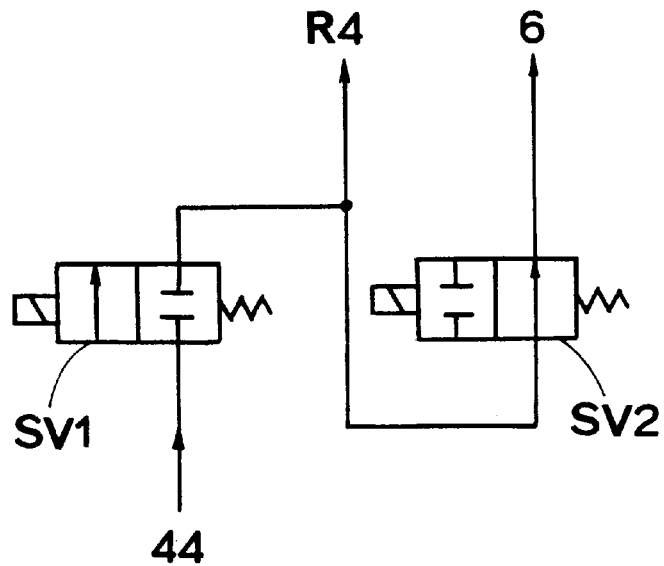
FIG. 6 is a circuit diagram of another embodiment of a pressure control valve device for use in the hydraulic brake apparatus of the above embodiment.

As shown in FIG. 6, the pressure control valve PCV may be constituted by a normally closed electromagnetic valve SV1 for opening or closing an inlet passage connecting the accumulator 44 to the counter-force chamber R4, and a normally open electromagnetic valve SV2 for opening or closing a drain passage connecting the counter-force chamber R4 to the reservoir 6. If the coefficient α is to be selected from values smaller than 1, the master cylinder pressure in the pressure chamber R2 or the regulated pressure in the power chamber R1 may be used for the pressure source of the counter-force chamber R4. According to the present embodiment, the single pressure chamber R2 is provided for supplying the master cylinder pressure to a couple of wheel brake cylinders, and the regulated pressure is supplied to the other couple of wheel brake cylinders. However, a couple of pressure chambers may be provided for generating the master cylinder pressure, one of which is provided for supplying the master cylinder pressure to a couple of wheel brake cylinders, and the other of which is provided for supplying the master cylinder pressure to the other couple of wheel brake cylinders. The hydraulic pressure control apparatus according to the present embodiment is preferably applied to a system having an anti-lock control system, which determines whether a wheel tends to be locked and controls the wheel brake cylinder pressure automatically so as to prevent the wheel from being locked.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic brake apparatus for applying braking force to each wheel of a vehicle in response to depression of a manually operated braking member comprising:

a cylinder body mountable on said vehicle;

a reservoir for storing brake fluid;

a master cylinder having a master piston slidably received in said cylinder body to define a pressure chamber ahead of said master piston and a power chamber behind said master piston, the brake fluid in said reservoir being fed into said pressure chamber, and said master piston being moved in response to operation of said manually operated braking member to discharge hydraulic brake pressure from said pressure chamber;

an auxiliary pressure source for pressurizing the brake fluid in said reservoir to discharge power pressure of a predetermined value;

a control piston slidably disposed in said cylinder body ahead of said master piston to be movable in response to movement of said master piston, said control piston defining ahead thereof a regulator chamber, and exposing a rear end thereof to said pressure chamber, said power chamber being communicated with said regulator chamber to assist forward movement of said master piston;

pressure increase valve means for communicating said regulator chamber with said auxiliary pressure source or cutting off the communication therebetween in response to movement of said control piston;

pressure decrease valve means for communicating said regulator chamber with said reservoir or cutting off the communication therebetween in response to movement of said control piston; and counter-force control means for producing counter-force in response to the pressure generated in one of said pressure chamber, said auxiliary pressure source and said power chamber, and applying the counter-force to said pressure increase valve means and said pressure decrease valve means to be moved in a direction opposite to a direction thereof moved by said control piston, said counter-force control means continuously varying the counter-force to be regulated into a predetermined force.

2. A hydraulic brake apparatus as set forth in claim 1, wherein said counter-force control means is adapted to produce the counter-force substantially in proportion to the pressure generated in one of said pressure chamber, said auxiliary pressure source and said power chamber, with a rate determined on the basis of driving and/or braking conditions of said vehicle.

3. A hydraulic brake apparatus as set forth in claim 2, wherein said counter-force control means comprises:

a resilient member disposed in said cylinder body for defining a counter-force pressure chamber into which pressure is fed from one of said pressure chamber, said auxiliary pressure source and said power chamber, said resilient member being adapted to activate said pressure increase valve means and said pressure decrease valve means to move in a direction opposite to a direction thereof moved by said control piston;

pressure control valve means for continuously varying the pressure in said counter-force pressure chamber to be regulated into a predetermined pressure; and control means for electrically controlling said pressure control valve means in response to the driving and/or braking conditions of said vehicle.

4. A hydraulic brake apparatus as set forth in claim 3, wherein said resilient member is disposed ahead of said pressure increase valve means and said pressure decrease valve means for defining said counter-force pressure chamber ahead of said pressure increase valve means and said pressure decrease valve means, and wherein said resilient member is supported by said cylinder body to receive the pressure in said counter-force pressure chamber.

5. A hydraulic brake apparatus as set forth in claim 3, further comprising:

a load sensor for detecting load applied to said vehicle; and a brake-pad friction sensor for detecting a coefficient of friction of a brake pad operatively mounted on said wheel of said vehicle, wherein said control means controls said pressure control valve means to regulate the pressure in said counter-force pressure chamber to be equal to the pressure generated in one of said pressure chamber, said auxiliary pressure source and said power chamber, when the load and the coefficient of friction of the brake pad are within a predetermined range, respectively, and wherein said control means controls said pressure control valve means to regulate the pressure in said counter-force pressure chamber to be zero, when the load detected by said load sensor is of the maximum value, and the coefficient of friction of the brake pad detected by said brake-pad friction sensor is of the minimum value.

6. A hydraulic brake apparatus as set forth in claim 5, further comprising a road friction sensor for detecting a coefficient of friction of a road on which said vehicle is running, wherein said control means controls said pressure control valve means to regulate the pressure in said counter-force pressure chamber to be greater than the pressure generated in one of said pressure chamber, said auxiliary pressure source and said power chamber, when the coefficient of friction of the road is relatively small.

7. A hydraulic brake apparatus as set forth in claim 3, further comprising means for detecting the braking condition of said vehicle including an emergency braking operation of said manually operated braking member, wherein said control means controls said pressure control valve means to provide a rate of the pressure in said counter-force pressure chamber to the pressure generated in one of said pressure chamber, said auxiliary pressure source and said power chamber to be relatively small, when the emergency braking operation is detected by said braking condition detecting means.

8. A hydraulic brake apparatus as set forth in claim 7, wherein said manually operated braking member is a brake pedal operatively mounted on said vehicle, and said braking condition detecting means comprises a position sensor for detecting a position of said brake pedal and a stroke sensor for detecting a stroke of said brake pedal, and wherein said braking condition detecting means determines that the emergency braking operation was made, when the stroke and speed of said brake pedal exceeded a predetermined stroke and a predetermined speed, respectively.

9. A hydraulic brake apparatus as set forth in claim 2, wherein said counter-force control means comprises:

a resilient member disposed in said cylinder body for defining a counter-force pressure chamber into which pressure is fed from said auxiliary pressure source, said resilient member being adapted to activate said pressure increase valve means and said pressure decrease valve means to move in a direction opposite to a direction thereof moved by said control piston;

pressure control valve means disposed in a passage connecting said counter-force pressure chamber with said auxiliary pressure source, said pressure control valve means continuously varying the pressure in said counter-force pressure chamber to be regulated into a predetermined pressure; and control means for electrically controlling said pressure control valve means in response to the driving and/or braking conditions of said vehicle.

10. A hydraulic brake apparatus as set forth in claim 9, wherein said pressure control valve means comprises a three-port three-position solenoid operated valve.

11. A hydraulic brake apparatus as set forth in claim 9, wherein said pressure control valve means comprises a couple of two-port two-position solenoid operated valves.

12. A hydraulic brake apparatus as set forth in claim 9, further comprising:

a load sensor for detecting load applied to said vehicle; and a brake-pad friction sensor for detecting a coefficient of friction of a brake pad operatively mounted on said wheel of said vehicle, wherein said control means controls said pressure control valve means to regulate the pressure in said counter-force pressure chamber to be equal to the pressure generated in said auxiliary pressure source, when the load and the coefficient of friction of the brake pad are within a predetermined range, respectively, and wherein said control means controls said pressure control valve means to regulate the pressure in said counter-force pressure chamber to be zero, when the load detected by said load sensor is of the maximum value, and the coefficient of friction of the brake pad detected by said brake-pad friction sensor is of the minimum value.

13. A hydraulic brake apparatus as set forth in claim 12, further comprising a road friction sensor for detecting a coefficient of friction of a road on which said vehicle is running, wherein said control means controls said pressure control valve means to regulate the pressure in said counter-force pressure chamber to be greater than the pressure generated in said auxiliary pressure source, when the coefficient of friction of the road is relatively small.

14. A hydraulic brake apparatus for applying braking force to each wheel of a vehicle in response to depression of a manually operated braking member comprising:

a cylinder body mountable on said vehicle;

a reservoir for storing brake fluid;

a master cylinder having a master piston slidably received in said cylinder body to define a pressure chamber ahead of said master piston and a power chamber behind said master piston, the brake fluid in said reservoir being fed into said pressure chamber, and said master piston being moved in response to operation of said manually operated braking member to discharge hydraulic brake pressure from said pressure chamber;

an auxiliary pressure source for pressurizing the brake fluid in said reservoir to discharge power pressure of a predetermined value;

a control piston slidably disposed in said cylinder body ahead of said master piston to be movable in response to movement of said master piston, said control piston defining ahead thereof a regulator chamber, and exposing a rear end thereof to said pressure chamber, said power chamber being communicated with said regulator chamber to assist forward movement of said master piston;

pressure increase valve means for communicating said regulator chamber with said auxiliary pressure source or cutting off the communication therebetween in response to movement of said control piston;

pressure decrease valve means for communicating said regulator chamber with said reservoir or cutting off the communication therebetween in response to movement of said control piston; and counter-force control means for producing counter-force in response to the pressure generated in said auxiliary pressure source, and applying the counter-force to said pressure increase valve means and said pressure decrease valve means to be moved in a direction opposite to a direction thereof moved by said control piston, said counter-force control means continuously varying the counter-force to be regulated into a predetermined force, said counter-force control means including:

a resilient member disposed in said cylinder body for defining a counter-force pressure chamber into which pressure is fed from said auxiliary pressure source, said resilient member being adapted to activate said pressure increase valve means and said pressure decrease valve means to move in a direction opposite to a direction thereof moved by said control piston;

pressure control valve means for continuously varying the pressure in said counter-force pressure chamber to be regulated into a predetermined pressure; and control means for electrically controlling said pressure control valve means in response to the driving and/or braking conditions of said vehicle, thereby to produce the counter-force substantially in proportion to the pressure generated in said auxiliary pressure source, with a rate determined on the basis of driving and/or braking conditions of said vehicle.

15. A hydraulic brake apparatus as set forth in claim 14, further comprising:

a load sensor for detecting load applied to said vehicle; and a brake-pad friction sensor for detecting a coefficient of friction of a brake pad operatively mounted on said wheel of said vehicle;

wherein said counter-force control means comprises:

a resilient member disposed in said cylinder body for defining a counter-force pressure chamber into which pressure is fed from one of said pressure chamber, said auxiliary pressure source and said power chamber, said resilient member being adapted to activate said pressure increase valve means and said pressure decrease valve means to move in a direction opposite to a direction thereof moved by said control piston;

pressure control valve means for continuously varying the pressure in said counter-force pressure chamber to be regulated into a predetermined pressure; and control means for electrically controlling said pressure control valve means in response to the driving and/or braking conditions of said vehicle; and wherein said control means controls said pressure control valve means to regulate the pressure in said counter-force pressure chamber to be equal to the pressure generated in one of said pressure chamber, said auxiliary pressure source and said power chamber, when the load and the coefficient of friction of the brake pad are within a predetermined range, respectively, and wherein said control means controls said pressure control valve means to regulate the pressure in said counter-force pressure chamber to be zero, when the load detected by said load sensor is of the maximum value, and the coefficient of friction of the brake pad detected by said brake-pad friction sensor is of the minimum value.

16. A hydraulic brake apparatus for applying braking force to each wheel of a vehicle in response to depression of a manually operated braking member comprising:

a cylinder body mountable on said vehicle;

a reservoir for storing brake fluid;

a master cylinder having a master piston slidably received in said cylinder body to define a pressure chamber ahead of said master piston and a power chamber behind said master piston, the brake fluid in said reservoir being fed into said pressure chamber, and said master piston being moved in response to operation of said manually operated braking member to discharge hydraulic brake pressure from said pressure chamber;

an auxiliary pressure source for pressurizing the brake fluid in said reservoir to discharge power pressure of a predetermined value;

a control piston slidably disposed in said cylinder body ahead of said master piston to be movable in response to movement of said master piston, said control piston defining ahead thereof a regulator chamber, and exposing a rear end thereof to said pressure chamber, said power chamber being communicated with said regulator chamber to assist forward movement of said master piston;

pressure increase valve means for communicating said regulator chamber with said auxiliary pressure source or cutting off the communication therebetween in response to movement of said control piston;

pressure decrease valve means for communicating said regulator chamber with said reservoir or cutting off the communication therebetween in response to movement of said control piston; and counter-force control means for producing counter-force in response to the pressure generated in said auxiliary pressure source, and applying the counter-force to said pressure increase valve means and said pressure decrease valve means to be moved in a direction opposite to a direction thereof moved by said control piston, said counter-force control means including:

a resilient member disposed in said cylinder body for defining a counter-force pressure chamber into which pressure is fed from said auxiliary pressure source, said resilient member being adapted to activate said pressure increase valve means and said pressure decrease valve means to move in a direction opposite to a direction thereof moved by said control piston;

pressure control valve means disposed in a passage connecting said counter-force pressure chamber with said auxiliary pressure source, said pressure control valve means continuously varying the pressure in said counter-force pressure chamber to be regulated into a predetermined pressure; and control means for electrically controlling said pressure control valve means in response to the driving and/or braking conditions of said vehicle, thereby to produce the counter-force substantially in proportion to the pressure generated in said auxiliary pressure source, with a rate determined on the basis of driving and/or braking conditions of said vehicle.

17. A hydraulic brake apparatus as set forth in claim 16, further comprising:

a load sensor for detecting load applied to said vehicle; and a brake-pad friction sensor for detecting a coefficient of friction of a brake pad operatively mounted on said wheel of said vehicle;

wherein said counter-force control means comprises:

a resilient member disposed in said cylinder body for defining a counter-force pressure chamber into which pressure is fed from one of said pressure chamber, said auxiliary pressure source and said power chamber, said resilient member being adapted to activate said pressure increase valve means and said pressure decrease valve means to move in a direction opposite to a direction thereof moved by said control piston;

pressure control valve means for continuously varying the pressure in said counter-force pressure chamber to be regulated into a predetermined pressure; and control means for electrically controlling said pressure control valve means in response to the driving and/or braking conditions of said vehicle; and wherein said control means controls said pressure control valve means to regulate the pressure in said counter-force pressure chamber to be equal to the pressure generated in one of said pressure chamber, said auxiliary pressure source and said power chamber, when the load and the coefficient of friction of the brake pad are within a predetermined range, respectively, and wherein said control means controls said pressure control valve means to regulate the pressure in said counter-force pressure chamber to be zero, when the load detected by said load sensor is of the maximum value, and the coefficient of friction of the brake pad detected by said brake-pad friction sensor is of the minimum value.

18. A hydraulic brake apparatus for applying braking force to each wheel of a vehicle in response to depression of a manually operated braking member comprising:

a cylinder body mountable on said vehicle;

a reservoir for storing brake fluid;

a master cylinder having a master piston slidably received in said cylinder body to define a pressure chamber ahead of said master piston and a power chamber behind said master piston, the brake fluid in said reservoir being fed into said pressure chamber, and said master piston being moved in response to operation of said manually operated braking member to discharge hydraulic brake pressure from said pressure chamber;

an auxiliary pressure source for pressurizing the brake fluid in said reservoir to discharge power pressure of a predetermined value;

a control piston slidably disposed in said cylinder body ahead of said master piston to be movable in response to movement of said master piston, said control piston defining ahead thereof a regulator chamber, and exposing a rear end thereof to said pressure chamber, said power chamber being communicated with said regulator chamber to assist forward movement of said master piston;

pressure increase valve means for communicating said regulator chamber with said auxiliary pressure source or cutting off the communication therebetween in response to movement of said control piston;

pressure decrease valve means for communicating said regulator chamber with said reservoir or cutting off the communication therebetween in response to movement of said control piston;

counter-force control means for producing counterforce in response to the pressure generated in one of said pressure chamber, said auxiliary pressure source and said power chamber, and applying the counter-force to said pressure increase valve means and said pressure decrease valve means to be moved in a direction opposite to a direction thereof moved by said control piston, said counter-force control means continuously varying the counter-force to be regulated into a predetermined force irrespective of operation of said manually operated braking member.

19. A hydraulic brake apparatus as set forth in claim 18, further comprising means for detecting the braking condition of said vehicle including an emergency braking operation of said manually operated braking member, wherein said control means controls said pressure control valve means to provide a rate of the pressure in said counter-force pressure chamber to the pressure generated in one of said pressure chamber, said auxiliary pressure source and said power chamber to be relatively small, when the emergency braking operation is detected by said braking condition detecting means.

20. A hydraulic brake apparatus as set forth in claim 18, further comprising:

- a load sensor for detecting load applied to said vehicle; and
- a brake-pad friction sensor for detecting a coefficient of friction of a brake pad operatively mounted on said wheel of said vehicle;

wherein said counter-force control means comprises:

- a resilient member disposed in said cylinder body for defining a counter-force pressure chamber into which pressure is fed from one of said pressure chamber, said auxiliary pressure source and said power chamber, said resilient member being adapted to activate said pressure increase valve means and said pressure decrease valve means to move in a direction opposite to a direction thereof moved by said control piston;
- pressure control valve means for continuously varying the pressure in said counter-force pressure chamber to be regulated into a predetermined pressure; and
- control means for electrically controlling said pressure control valve means in response to the driving and/or braking conditions of said vehicle; and wherein said control means controls said pressure control valve means to regulate the pressure in said counter-force pressure chamber to be equal to the pressure generated in one of said pressure chamber, said auxiliary pressure source and said power chamber, when the load and the coefficient of friction of the brake pad are within a predetermined range, respectively, and wherein said control means controls said pressure control valve means to regulate the pressure in said counter-force pressure chamber to be zero, when the load detected by said load sensor is of the maximum value, and the coefficient of friction of the brake pad detected by said brake-pad friction sensor is of the minimum value.

* * * * *